June 14, 1960   R. L. ATKIN   2,940,561
BRAKE CONTROL SYSTEM
Filed May 28, 1956
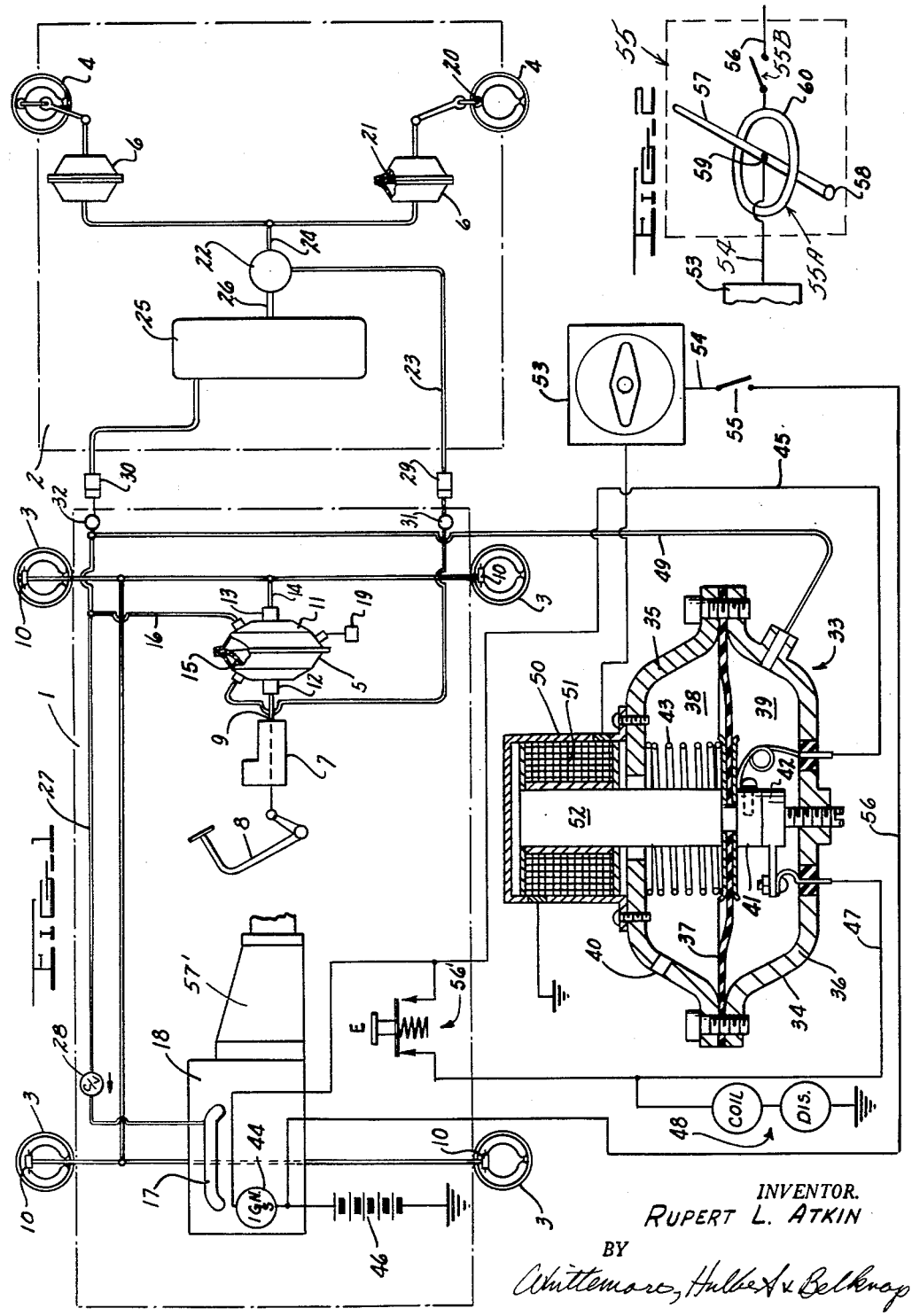
INVENTOR.
RUPERT L. ATKIN
BY
Whittemore, Hulbert & Belknap
ATTORNEYS

2,940,561
BRAKE CONTROL SYSTEM

Rupert L. Atkin, Grosse Pointe Woods, Mich., assignor to Kelsey-Hayes Company, a corporation of Delaware Filed May 28, 1956, Ser. No. 587,792

10 Claims. (Cl. 192—3)

The invention relates to brake control systems and refers more particularly to brake control systems for use in tractor and trailer brake systems.

The invention has for one of its objects to provide a brake control system for a tractor and a trailer in which the motor for propelling the tractor is stopped from running under its own power when the differential pressure used in applying the trailer brakes is too low to satisfactorily accomplish the braking of the trailer.

The invention has for another object to provide a brake control system having a control power device controlled by the differential fluid pressure for applying the trailer brakes and controlling the operation of the motor for propelling the tractor.

The invention has for other objects to provide a control power device for making and breaking the ignition circuit of the internal combustion engine for propelling the tractor; to provide a manually operable switch for by-passing the control power device; to provide an electro-magnet in the control power device, for use in breaking the ignition circuit in the event that the trailer brakes cannot be satisfactorily applied; and to provide a time delay in the electro-magnet electric circuit to secure enough engine running time before the electro-magnet can operate to break the ignition circuit so that the predetermined minimum of differential fluid pressure can normally be secured.

These and other objects will become apparent from the following description taken in connection with the following drawings, in which:

Figure 1 is a diagrammatic view of a tractor and trailer brake system including a brake control system embodying the invention.

Figure 2 is a diagrammatic view of the transmission switch for a manual gear shift type transmission.

The brake control system is particularly applicable to tractor and trailer brake systems in which the tractor is a commercial truck of conventional design equipped with conventional brakes and the trailer is also of conventional design equipped with conventional brakes. More particularly, the brake control system is designed for use in a tractor and trailer brake system equipped with tractor and trailer power devices for applying the tractor and trailer brakes respectively. In general, the tractor and trailer brake system comprises the tractor 1 and the trailer 2 respectively equipped with the wheel brakes 3 and 4 and the differential fluid pressure operated power devices 5 and 6 for operating the respective brakes 3 and 4. The tractor is also equipped with the master cylinder 7 which is conventional and mounted on the tractor and has its piston (not shown) connected to and operable by the conventional manually operable brake pedal 8 to displace, upon operation of the pedal, brake fluid into the conduit 9 which is connected to the tractor power device 5. The tractor brakes 3 are adapted to be applied by the wheel cylinders 10 which are of conventional design and are adapted to be operated by brake fluid displaced by the tractor power device 5.

The tractor power device 5 is, in the present instance, of the vacuum suspended type such as illustrated in the patent to J. J. Klimkiewicz 2,377,699 issued June 5, 1945. This power device has the housing 11 and the axially aligned low and high pressure cylinders 12 and 13 respectively at the ends of the housing, the low pressure cylinder being connected to the conduit 9 and the high pressure cylinder to the conduit 14 which is connected to the wheel cylinders 10. The power device 5 also has the differential air pressure operated movable wall 15 in the nature of a diaphragm within the housing and the operation of this wall is controlled by vacuum and air valves operable by a control plunger in the low pressure cylinder 12. The wall is connected to a power plunger reciprocable within the high pressure cylinder 13. The rear chamber formed by the rear portion of the housing and the movable wall is connected by the conduit 16 to a suitable source of vacuum, such as the intake manifold 17 of the motor or internal combustion engine 18 with which the tractor is equipped to supply the propelling force. The front chamber formed by the front portion of the housing and the movable wall is adapted to be connected to the atmosphere by means of a conduit extending within the rear chamber and connected to the air cleaner 19 and the air port which latter is controlled by the air valve.

The trailer brakes 4 are adapted to be applied in a conventional manner. As illustrated in the present instance, the brakes are adapted to be applied by the cams 20 which are mechanically connected to the movable walls 21 of the trailer power devices 6. The movable walls are diaphragms. The power devices are of conventional design and alike and are of the atmospheric suspended type. The operation of the trailer power devices is controlled by the relay or conversion valve 22 which is of conventional design and has a chamber connected by the control conduit 23 to the front variable pressure chamber of the tractor power device 5, another chamber connected to the trailer power devices 6 by the conduit 24 and normally open to the atmosphere and still another chamber connected to the vacuum tank 25 by the conduit 26. The valve is operated upon energization of the tractor power device 5 to first close the communication between the atmosphere and the conduit 24 and then open the communication between the vacuum tank 25 and the conduit 24. The relay or conversion valve 22 and the vacuum tank 25 are mounted on and form part of the equipment of the trailer and the vacuum tank is adapted to be connected to the intake manifold 17 by means of the conduit 27 which is provided with the check valve 28. This check valve is of conventional construction for passage of air only from the vacuum tank to the intake manifold. Both the conduits 23 and 27 are provided with the couplings 29 and 30 respectively to provide for connecting and disconnecting the trailer from the tractor, the couplings being conventional. Also, conventional shut-off valves 31 and 32 are provided in the conduits adjacent to and in advance or forward of the couplings.

For the purpose of automatically stopping the internal combustion engine of the tractor in the event that the sub-atmospheric pressure of air in the vacuum tank 25 is too high, either because the pressure of the air in the vacuum tank 25 has not been lowered below the required maximum or has been raised above the required maximum to satisfactorily operate the trailer power devices 6, I have provided the following control system. This system has the differential fluid pressure operated control power device 33 which is preferably mounted on the tractor and comprises the housing 34 formed of the upper and lower dished sections 35 and 36 respectively, and the movable wall 37 between the dished sections and dividing the housing into the upper and lower chambers 38 and 39 respectively. The upper chamber 38 is open to the atmosphere through a suitable air port 40 in the upper section 35. The diaphragm has fixedly secured thereto the movable contact 41 which is normally held in engagement with the stationary contact 42 by the coil spring 43, the latter being between the diaphragm and the top of the upper section 35. The ignition switch 44 is adapted to electrically connect the movable contact 41 through the wire 45 to the source of electrical energy 46, such as the storage battery with which the tractor is equipped. Both the movable and stationary contacts 41 and 42 are located within the lower chamber 39 and the stationary contact 42 is adjustably secured to the bottom of the lower section 36 and is electrically connected by the wire 47 to the ignition circuit 48 of the internal combustion engine 18. Both the battery and the ignition circuit are grounded so that when the ignition switch 44 is closed, the ignition circuit 48 is normally in a closed circuit.

The lower chamber 39 within the housing 34 is connected to the vacuum conduit 27 in the rear of the check valve 28 by the conduit 49 so that the lower chamber is subject to the same sub-atmospheric pressure as that within the vacuum tank. When the pressure in the vacuum tank is less than a predetermined amount, the force of the spring 43 together with the differential pressure acting on the diaphragm 37 is sufficient to hold the contacts 41, 42 closed against the action of the electro-magnet 50 described more fully below.

To break the ignition circuit of the engine, when the pressure in the vacuum tank is above or greater than the predetermined required maximum or permissible higher limit I have provided the electro-magnet 50 which is carried by the upper section 35 of the housing 34 and has the winding 51 and the core 52. The core is connected to the movable contact 41 and the winding has a strength such that when energized it creates a sufficient force on the core to overcome the spring 43 and the differential pressure on the diaphragm 37 when the sub-atmospheric pressure is above the predetermined maximum to withdraw the movable contact 41 from the stationary contact 42 thereby breaking the ignition circuit 48. The winding 51 is connected at one side directly to the time delay 53 which is connected by wire 54 to the transmission switch 55 in turn connected by the wire 56 to the battery 46. The winding 51 is grounded at its other side. The time delay is an electrically-actuated pneumatically-timed delay relay of convention construction which can be set so that it will have a time lag of a predetermined number of seconds before it becomes effective in allowing electric current to flow to the winding of the electro-magnet after which time the electro-magnet is energized continuously during the normal operation of the engine. The transmission switch is constructed to be closed when the engine is running and the transmission 57' is placed in gear. The time lag of the time delay starts when the transmission switch is closed.

To enable the truck driver to connect the storage battery 46 to the ignition circuit 48 of the engine, after the automatic switch containing the contacts 41 and 42 has opened, there is the manually operable normally open switch 56', which may be closed to by-pass the automatic switch. By closing this switch, the truck may be driven to a repair point.

If desired, an air gage and a warning light or buzzer in the truck driver's compartment and connected to the vacuum conduit 27 in rear of the check valve 28 may be provided to warn the driver when the sub-atmospheric pressure is slightly above the predetermined permissible maximum. The time lag of the time delay is sufficient to secure enough engine running time before the electro-magnet can operate to break the ignition circuit so that the predetermined minimum of differential fluid pressure can normally be secured.

The transmission switch 55 is shown diagrammatically in Fig. 2 and includes a switch 55A which is closed when the transmission is placed in gear and a switch 55B which is closed when the engine is running. The switch 55A is shown associated with a transmission of the manual gear shift type. The gear shift lever 57 has its lower end supported for universal movement by the swivel connection 58 and the wire 54 is connected to annular contact 59 carried by and encircling the gear shift lever 57 intermediate the ends of the latter. A ring 60 of electrically conductive material surrounds the gear shift lever in position to be engaged by a contact 59 in the low, second, high and reverse positions of the gear shift lever. In neutral position, the gear shift lever extends substantially centrally through the ring with the contact 59 out of engagement with the ring. Wire 56 is connected to the ring. Thus the switch 55A is closed when the transmission is placed in gear and is open when the transmission is in neutral. The switch 55B is closed when the engine is running and opened when the engine is not running. Switch 55B is a pressure switch which may be in communication with the oil system of the engine. When the engine is running, sufficient pressure is developed in the oil system to close pressure switch 55B. Hence the switch 55, which includes the two switches 55A and 55B in series, closes when the transmission is placed in gear and the engine is running as stated above.

The transmission switch may be used in association with either a manual gear shift transmission or an automatic type transmission, and in either case the switch is adapted to be closed when the engine is running and the transmission is placed in gear. It will also be appreciated that the brake control system may be incorporated in a system, well-known to those skilled in the art, in which the trailer brakes are adapted to be applied by power devices which are dependent for their operation on air above atmospheric pressure instead of air below atmospheric pressure.

What I claim as my invention is:

1. In a vehicle of the type including an internal combustion engine and a transmission adapted to be placed in gear to propel the vehicle and a brake, an electric ignition circuit for the engine, a differential fluid pressure power device for applying the brake, a vacuum tank containing air under sub-atmospheric pressure for operating said power device, a control device for automatically controlling said ignition circuit having a movable wall dividing said control device into chambers at opposite sides of said wall, a stationary contact carried by said control device, a contact carried by said movable wall for movement as a unit therewith, said contacts forming a switch connected in said ignition circuit to open and close the latter, means for subjecting one of said chambers to the pressure of the air in said tank and for subjecting the other chamber to a contant pressure different from the pressure of the air in said tank to apply a differential fluid pressure on said movable wall in one direction, means including the differential fluid pressure acting on said movable wall normally maintaining said contacts in engagment, and an electro-magnet for exerting a force on said movable wall in the opposite direction sufficient to move said second-mentioned contact out of engagement with said stationary contact when the differential pressure acting on said movable wall is below a predetermined minimum.

2. The structure set forth in claim 1 including a time delay relay for energizing said electro-magnet a predetermined period of time following actuation thereof, and means for actuating said time delay relay including means responsive to placing the transmission in gear and means responsive to running of the engine.

3. In a vehicle of the type including an internal combustion engine and a transmission adapted to be placed in gear to propel the vehicle and a brake, an electric igniton circuit for the engine, a differential fluid pressure power device for applying the brake, means for applying differential fluid pressure to said power device to operate the same, a switch for automatically controlling said ignition circuit, an electro-magnet for opening said switch to open said circuit in response to a drop in the differential fluid pressure below a predetermined minimum, time delay means for energizing said electro-magnet a predetermined time interval after operation thereof, and means responsive to placing the transmission in gear and running of the engine for operating said time delay means.

4. In a vehicle of the type including an internal combustion engine and a transmission adapted to be placed in gear to propel the vehicle and a brake, an electric ignition circuit for the engine, a differential fluid pressure power device for applying the brake, means for applying differential fluid pressure to said power device to operate the same, means for opening said circuit in response to a drop in the differential fluid pressure below a predetermined minimum, time delay means for operating said second-mentioned means a predetermined time interval after actuation thereof, and means responsive to placing the transmission in gear and running of the engine for actuating said time delay means.

5. In a vehicle of the type including an internal combustion engine and a transmission adapted to be placed in gear to propel the vehicle and a brake, an electric ignition circuit for the engine, a differential fluid pressure power device for applying the brake, means for applying differential fluid pressure to said power device to operate the same, a switch having a contact normally urged to a position closing said ignition circuit by means including the differential fluid pressure, an electro-magnet for opening said switch to open said ignition circuit in response to a drop in the differential fluid pressure below a predetermined minimum, a time delay relay operative to energize said electro-magnet after a predetermined time interval following actuation thereof, control means for actuating said time delay relay including means responsive to placing the transmission in gear and means responsive to running of the engine.

6. In a vehicle of the type including an internal combustion engine and a transmission adapted to be placed in gear to propel the vehicle and a brake, an electric ignition circuit for the engine, a differential fluid pressure power device for applying the brake, means for applying differential fluid pressure to said power device to operate the same, a switch for automatically controlling said ignition circuit, means including the differential fluid pressure for closing said switch to close said ignition circuit, means for opening said switch to open said circuit in response to a drop in the differential fluid pressure below a predetermined minimum, time delay means for operating said switch opening means after a predetermined time interval following actuation of said time delay means, and control means for actuating said time delay means including means responsive to placing the transmission in gear and means responsive to running of the engine.

7. In a vehicle of the type including an internal combustion engine and a transmission adapted to be placed in gear to propel the vehicle and a brake, an electric ignition circuit for the engine, a differential fluid pressure power device for applying the brake, means for applying differential fluid pressure to said power device to operate the same, means for opening said circuit in response to a drop in the differential fluid pressure below a predetermined minimum, time delay means for operating said second-mentioned means a predetermined time interval after the actuation thereof, and control means for actuating said time delay means including means responsive to running of the engine.

8. In a vehicle of the type including an internal combustion engine and a transmission adapted to be placed in gear to propel the vehicle and a brake, an electric ignition circuit for the engine, a differential fluid pressure power device for applying the brake, a vacuum tank containing air under sub-atmospheric pressure for operating said power device, a switch for automatically controlling said ignition circuit, an electro-magnet for opening said switch to open said circuit in response to an increase in the pressure of the air in said vacuum tank above a predetermined maximum, time delay means for energizing said electro-magnet a predetermined time interval after actuation thereof, and control means for actuating said time delay means including means responsive to placing the transmission in gear and means responsive to running of the engine.

9. In a vehicle of the type including an internal combustion engine and a transmission adapted to be placed in gear to propel the vehicle and a brake, an electric ignition circuit for the engine, a differential fluid pressure power device for applying the brake, a vacuum tank containing air under sub-atmospheric pressure for operating said power device, a switch for automatically controlling said ignition circuit, means including the air pressure in said vacuum tank for closing said switch to close said ignition circuit, means for opening said switch to open said circuit in response to a rise in the air pressure in said vacuum tank above a predetermined maximum, time delay means for operating said switch opening means after a predetermined time interval following actuation of said time delay means, and control means responsive to placing the transmission in gear and to running of the engine for actuating said time delay means.

10. In a vehicle of the type including an internal combustion engine and a transmission adapted to be placed in gear to propel the vehicle and a brake, an electric ignition circuit for the engine, a differential fluid pressure power device for applying the brake, means for applying differential fluid pressure to said power device to operate the same, means for opening said ignition circuit in response to a drop in the differential fluid pressure below a predetermined minimum, time delay means for operating said second-mentioned means a predetermined time interval after actuation thereof, and means for actuating said time delay means including means responsive to placing the transmission in gear.

References Cited in the file of this patent

UNITED STATES PATENTS

| | | |
|---|---|---|
| 1,850,626 | Hukill | Mar. 22, 1932 |
| 2,049,531 | White | Aug. 4, 1936 |
| 2,088,486 | Schoepf et al. | July 27, 1937 |
| 2,451,139 | Williams et al. | Oct. 12, 1948 |
| 2,459,938 | Higgins | Jan. 25, 1949 |
| 2,509,400 | Roswell | May 30, 1950 |
| 2,694,468 | Price | Nov. 16, 1954 |

FOREIGN PATENTS

| | | |
|---|---|---|
| 872,743 | Germany | Apr. 2, 1953 |